May 8, 1962 L. H. EDWARDS 3,033,294
ROTARY ROD WEEDER ATTACHMENTS FOR CULTIVATORS
Filed March 17, 1960 2 Sheets-Sheet 1
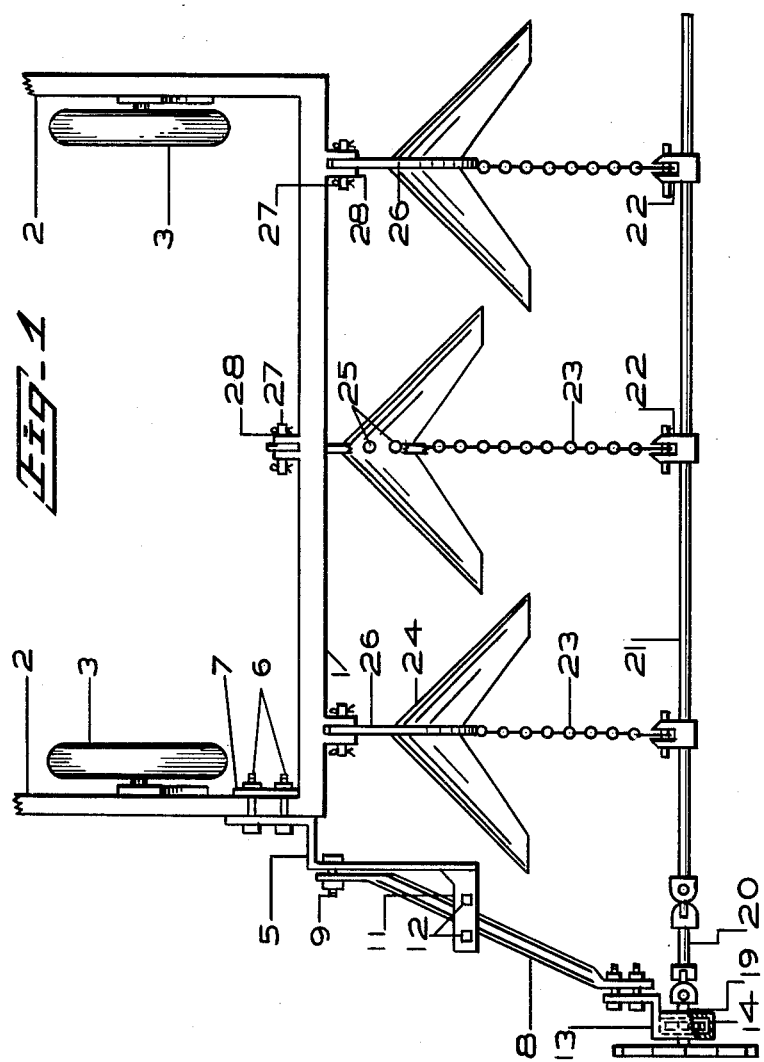

May 8, 1962    L. H. EDWARDS    3,033,294
ROTARY ROD WEEDER ATTACHMENTS FOR CULTIVATORS
Filed March 17, 1960    2 Sheets-Sheet 2
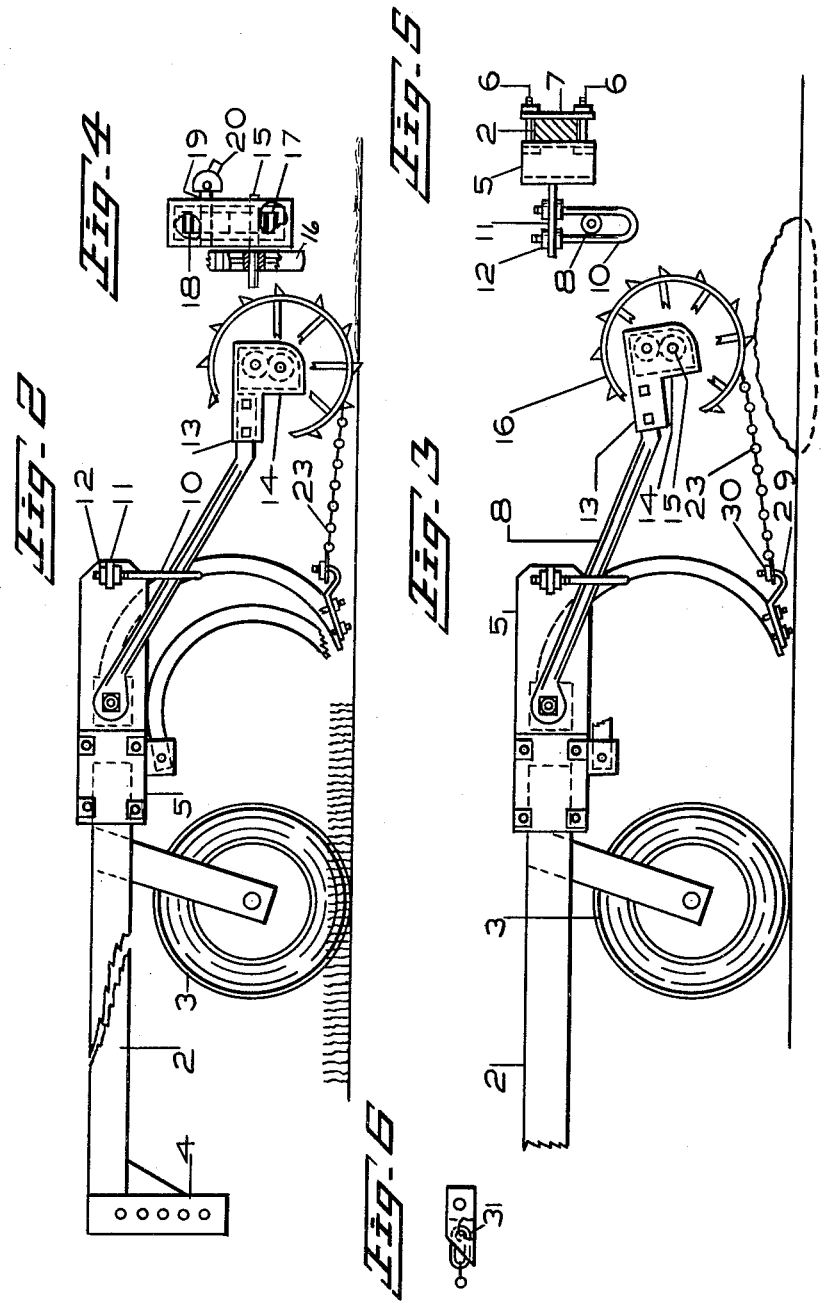

United States Patent Office 3,033,294
Patented May 8, 1962

3,033,294
ROTARY ROD WEEDER ATTACHMENTS FOR CULTIVATORS
Lawrence Henry Edwards, 822 10th St. S., Lethbridge, Alberta, Canada
Filed Mar. 17, 1960, Ser. No. 15,654
2 Claims. (Cl. 172—44)

This invention relates to rotary rod weeders, having reference to an improved mounting for the weeder rod by which it may be attached in following relation to a cultivator.

In the art to which the invention relates, for obtaining a more complete weed kill by cultivators, weeder rods are employed with the cultivators, and these are more usually carried directly by the shovels of the cultivator, these shovels being attached on shanks pivoted in the cultivator frame. Such attachments operate too deeply for killing small weeds and in addition have no protection against bending in rocky areas, as occurs when the weeder rod is attached to cultivators using solid shanks.

In the present device the weeder rod works just under the surface of the ground without added weight on the rod and may travel undamaged by going over rocks. To accomplish this the weeder rod is drawn by chains attached to the lower ends of the cultivator shanks so that the chains draw down on the weeder rod, producing below the ground cultivating by the weeder rod that is nevertheless shallow and effectively complements the deeper cultivating of the shovels. Such an arrangement requires the ground to be worked ahead of it, this being done by the shovels. In addition the rod is driven reversely to the travel of the cultivator, that is, counterclockwise as viewed from the right, and consequently tends to work its way into the ground.

In the drawings, illustrating a preferred embodiment of the invention,

FIG. 1 is a top plan view of a weeder rod assembly in accordance with my invention, shown in attachment in following relation to a cultivator of which a fragment of the frame and the supporting wheels is indicated.

FIG. 2 is a side elevation of the weeder rod assembly and cultivator as illustrated in FIGURE 1, shown as broken away in part and with the shovels omitted.

FIG. 3 is a side view similar to that of FIGURE 2, but illustrating travel of the weeder rod drive wheel when an obstruction is encountered.

FIG. 4 is an enlarged rear end view of the gear box for mounting the weeder rod drive wheel, including fragments of the wheel and weeder rod connection.

FIG. 5 shows an enlarged rear end view of the U bracket mounting for supporting the weeder rod assembly draft arm, shown attached to a cultivator side bar.

FIG. 6 is a top view of the connecting link for engagement of a chain to a hook attached to a cultivating shovel bolt.

Having reference to the drawings, at 1 is indicated a cross beam of a cultivator in following relation to which the present weeder rod assembly is to be attached, the frame including side bars 2 with supporting wheels 3 and tractor hitch 4.

Rearwardly on the one frame side bar is attached an arm 5 by bolts 6 that engage a clamping plate 7 for attachment on the bar. To the arm 5 attaches pivotally a draft arm 8 by a bolt 9, the arm having intermediate support by a U bracket 10 attached by nuts 12 and carried by a plate 11 welded to the arm 5.

The outer end of the arm 8 has attached thereto an arm 13 integral on a gear box 14 in which is mounted to rotate an axle shaft 15 having fixed thereto a drive wheel 16. The shaft 15 has attached a pinion 17 meshing with a pinion 18 on a weeder rod drive shaft 19 rotatable in the gear box.

The shaft 19 connects by a universal coupling assembly 20 in driving relation to a weeder rod 21 that is carried rotatable in shoes 22 connected by chains 23 in following relation to cultivator shovels 24 mounted by bolts 25 on shanks 26 pivotally attached by pins 27 and lugs 28 to the cultivator frame 1.

To the shovel attaching bolts 25 are engaged threaded hooks 29 with nuts 30. To these hooks the chains 23 attach by end links 31.

In the use of the attachment, the weeder rod 21 is driven counterclockwise, as viewed from the right side of the machine, by the drive wheel 16, and the weeder rod is dragged through the soil turned over by the cultivator shovels by connection of the chains 23.

The chains 23 are attached to the lower ends of the shovel carrying shanks 26 by the bolts 25 and hooks 29, and when the shovels are traveling in cultivating relation to the ground the bolts 25 and hooks 29 are below the ground level. This pulls down on the weeder rod and this downward pull coupled with the fact that the weeder rod is driven reversely, that is with the rod rotating counterclockwise as viewed from the right, the weeder rod digs into the ground, and in view of this it is not necessary to weight the weeder rod to cause it to dig it, it being understood that the shovel carrying shanks 26 would be urged into working relation with the soil by spring means, as is common in the art, such, for example, as shown in the United States Patent to Altgelt, Number 2,690,111. Further, in view of the pivotal mounting of the draft arm 8 carrying the weeder rod drive wheel the rod can ride over obstructions.

Elevation of the cultivator frame for travel would carry the drive wheel 16 with it, in view of the support given by the arm 8 engaging in the bracket 10.

While chains are shown by which the weeder rod shoes are connected in following relation to the cultivator shanks, it is to be understood other connections of flexible material or linkage could be used.

The attachment, in addition, considerably reduces the cost in view of the simplicity of its construction and its adaptability for attachment in following relation to any standard cultivator without requiring drive or other added connections.

Having thus particularly described and ascertained the nature of my said invention, what I claim and wish to secure by Letters Patent is:

1. A rotary rod weeder and means for attachment of the weeder in following relation to a cultivator of a character having a wheel supported frame and cultivator shanks pivotally mounted therein, said weeder including a draft arm, means pivotally mounting the forward end of the draft arm on the cultivator frame, a ground wheel mounted for rotation at the other end of the draft arm, a rotary rod connected to be driven by the ground wheel reversely to the direction of travel of the cultivator, shoes in which the rotary rod is carried for free rotation therein, said shoes each aligning with a cultivator shank, and a chain connecting each shoe to the lower end portion of the cultivator shank with which it is aligned and for travel rearwardly spaced therefrom.

2. A rotary rod weeder as set out in claim 1 in which the mounting means for the draft arm includes an arm fixedly attached to the frame, and a guiding bracket vertically attached on the fixed arm straddling an intermediate portion of the draft arm for free guiding relation therewith.

References Cited in the file of this patent

UNITED STATES PATENTS

| | | |
|---|---|---|
| 1,232,149 | Wolfe | July 3, 1917 |
| 1,855,326 | Terry | Apr. 26, 1932 |
| 2,820,405 | Puckett | Jan. 21, 1958 |